US012741302B2

(12) United States Patent
Young et al.

(10) Patent No.: US 12,741,302 B2
(45) Date of Patent: Sep. 22, 2026

(54) METHODS AND SYSTEMS FOR ADVANCED BATTERY COLLECTION, SORTING, AND PACKAGING

(71) Applicant: Li Industries, Inc., Pineville, NC (US)

(72) Inventors: David Young, Sudbury, MA (US); Zheng Li, Charlotte, NC (US); Panni Zheng, Charlotte, NC (US); Keyur Paraskar, Blacksburg, VA (US); Tairan Yang, Indian Land, NC (US)

(73) Assignee: Li Industries, Inc., Pineville, NC (US)

( * ) Notice: Subject to any disclaimer, the term of this patent is extended or adjusted under 35 U.S.C. 154(b) by 0 days.

(21) Appl. No.: 19/030,227

(22) Filed: Jan. 17, 2025

(65) Prior Publication Data

US 2025/0162007 A1 May 22, 2025

Related U.S. Application Data

(63) Continuation of application No. PCT/US2023/070311, filed on Jul. 17, 2023.
(Continued)

(51) Int. Cl.
*B09B 3/30* (2022.01)
*B03C 1/23* (2006.01)
(Continued)

(52) U.S. Cl.
CPC .................. *B09B 3/30* (2022.01); *B03C 1/23* (2013.01); *H01M 10/54* (2013.01); *B03C 2201/24* (2013.01); *B09B 2101/16* (2022.01)

(58) Field of Classification Search
CPC ......... B03C 1/23; B03C 2201/24; B09B 3/30; B09B 2101/16; B07C 5/342; B07C 5/3416; H01M 10/54; H01M 10/482
See application file for complete search history.

(56) References Cited

U.S. PATENT DOCUMENTS 4,350,442 A 9/1982 Arild et al.
6,519,315 B2 2/2003 Sommer, Jr. et al.
(Continued)

FOREIGN PATENT DOCUMENTS

AU 2010202919 A1 9/2011
CN 1193558 A 9/1998
(Continued)

OTHER PUBLICATIONS

Dai et al., "EverBatt: a Closed-loop Battery Recycling Cost and Environmental Impacts Model," Argonne National Laboratory, 2019, 88 pages.

(Continued)

*Primary Examiner* — Michael Mccullough
*Assistant Examiner* — Kalyanavenkateshware Kumar
(74) *Attorney, Agent, or Firm* — COOLEY LLP

(57) ABSTRACT

Embodiments described herein relate to methods of sorting energy storage devices. In some aspects a method can include measuring, via a physical sensing device, a physical property of a first plurality of energy storage devices. The method further includes sorting the first plurality of energy storage devices into a second plurality of energy storage devices and a third plurality of energy storage devices, delivering the second plurality of energy storage devices to a first location. The method further includes measuring, via a magnetic sensing device, a magnetic property of the third plurality of energy storage devices and sorting the third plurality of energy storage devices into a fourth plurality of energy storage devices and a fifth plurality of energy storage devices, delivering the fourth plurality of energy storage devices to a second location.

14 Claims, 3 Drawing Sheets

Related U.S. Application Data

(60) Provisional application No. 63/368,732, filed on Jul. 18, 2022.

(51) Int. Cl.

| | |
|---|---|
| ***H01M 10/54*** | (2006.01) |
| *B09B 101/16* | (2022.01) |

(56) References Cited

U.S. PATENT DOCUMENTS

| | | | | |
|---|---|---|---|---|
| 6,888,917 | B2 | 5/2005 | Sommer, Jr. et al. | |
| 7,198,865 | B2 | 4/2007 | Sloop | |
| 7,902,299 | B2 | 3/2011 | Kerr et al. | |
| 8,067,107 | B2 | 11/2011 | Sloop et al. | |
| 8,497,030 | B2 | 7/2013 | Sloop | |
| 8,823,329 | B2 | 9/2014 | Sloop et al. | |
| 8,846,225 | B2 | 9/2014 | Sloop | |
| 9,287,552 | B2 | 3/2016 | Sloop | |
| 9,484,606 | B1 | 11/2016 | Sloop et al. | |
| 9,785,851 | B1 | 10/2017 | Torek et al. | |
| 9,825,341 | B2 | 11/2017 | Sloop | |
| 10,014,562 | B2 | 7/2018 | Sloop | |
| 10,333,183 | B2 | 6/2019 | Sloop | |
| 10,697,909 | B2 | 6/2020 | Loeffler et al. | |
| 11,278,937 | B2 | 3/2022 | Kumar et al. | |
| 11,394,062 | B2 | 7/2022 | Sloop | |
| 11,747,290 | B2 | 9/2023 | Young et al. | |
| 12,521,766 | B1 | 1/2026 | Young et al. | |
| 2001/0022830 | A1 | 9/2001 | Sommer et al. | |
| 2002/0094058 | A1 | 7/2002 | Kaiser et al. | |
| 2003/0147494 | A1 | 8/2003 | Sommer et al. | |
| 2003/0186110 | A1 | 10/2003 | Sloop | |
| 2005/0078786 | A1 | 4/2005 | Sommer et al. | |
| 2005/0244704 | A1 | 11/2005 | Sloop et al. | |
| 2008/0137807 | A1 | 6/2008 | Yukisada et al. | |
| 2008/0279329 | A1 | 11/2008 | Sommer, Jr. et al. | |
| 2010/0146761 | A1 | 6/2010 | Sloop | |
| 2010/0203366 | A1 | 8/2010 | Sloop | |
| 2011/0222654 | A1 | 9/2011 | Sommer et al. | |
| 2017/0014868 | A1 | 1/2017 | Garcia, Jr. et al. | |
| 2018/0031497 | A1 | 2/2018 | Parks et al. | |
| 2018/0243800 | A1 | 8/2018 | Kumar et al. | |
| 2018/0358480 | A1 | 12/2018 | Stradins et al. | |
| 2019/0260100 | A1 | 8/2019 | Sloop | |
| 2021/0143489 | A1 | 5/2021 | Sloop et al. | |
| 2021/0304122 | A1 * | 9/2021 | Dattamajumdar | G16H 40/20 |
| 2022/0016675 | A1 | 1/2022 | Kumar et al. | |
| 2022/0271356 | A1 | 8/2022 | Sloop et al. | |
| 2022/0352572 | A1 | 11/2022 | Sloop | |
| 2023/0070883 | A1 | 3/2023 | Sloop et al. | |
| 2023/0198041 | A1 | 6/2023 | Sloop et al. | |
| 2023/0395889 | A1 | 12/2023 | Yang et al. | |
| 2023/0411725 | A1 | 12/2023 | Yang et al. | |
| 2024/0027376 | A1 | 1/2024 | Young et al. | |

FOREIGN PATENT DOCUMENTS

| | | | | | |
|---|---|---|---|---|---|
| CN | 102066912 | A | | 5/2011 | |
| CN | 102519919 | A | | 6/2012 | |
| CN | 103149372 | A | | 6/2013 | |
| CN | 106040618 | A | | 10/2016 | |
| CN | 106537305 | A | | 3/2017 | |
| CN | 107857066 | A | * | 3/2018 | B65G 35/00 |
| CN | 107886500 | A | | 4/2018 | |
| CN | 107921484 | A | | 4/2018 | |
| EP | 0795919 | A2 | | 9/1997 | |
| EP | 1009049 | A2 | | 6/2000 | |
| EP | 1132152 | A2 | | 9/2001 | |
| EP | 1132992 | B1 | | 4/2007 | |
| JP | 5969685 | B1 | | 8/2016 | |
| RU | 2204811 | C1 | | 5/2003 | |
| WO | WO-1992017791 | A1 | | 10/1992 | |
| WO | WO-9419838 | A1 | * | 9/1994 | H01M 10/54 |
| WO | WO-1994019838 | A1 | | 9/1994 | |
| WO | WO-2000008700 | A1 | | 2/2000 | |
| WO | WO-2007014532 | A1 | | 2/2007 | |
| WO | WO-2009105713 | A1 | | 8/2009 | |
| WO | WO-2010014637 | A1 | | 2/2010 | |
| WO | WO-2010077982 | A2 | | 7/2010 | |
| WO | WO-2014152650 | A1 | | 9/2014 | |
| WO | WO-2014153570 | A2 | * | 9/2014 | C10G 33/00 |
| WO | WO-2017011835 | A1 | | 1/2017 | |
| WO | WO-2017142644 | A2 | | 8/2017 | |
| WO | WO-2018203055 | A1 | | 11/2018 | |
| WO | WO-2020236513 | A1 | | 11/2020 | |
| WO | WO-2024020336 | A1 | | 1/2024 | |

OTHER PUBLICATIONS

Extended European Search Report for Application No. 20763945.1, dated Dec. 23, 2022, 9 pages.

International Preliminary Report on Patentability for Application No. PCT/US2020/019910, dated Sep. 10, 2021, 8 pages.

International Preliminary Report on Patentability for Application No. PCT/US2023/070311, dated Dec. 18, 2024, 7 pages.

International Search Report and Written Opinion for Application No. PCT/US2020/019910, dated Jun. 10, 2020, 8 pages.

International Search Report and Written Opinion for PCT Application No. PCT/US2023/070311, dated Nov. 9, 2023, 14 pages.

Journal of Electronics and Information Technology, vol. 35, No. 1, 2013, 27 pages.

Lipu et al. "A review of state of health and remaining useful life estimation methods for lithium-ion battery in electric vehicles: Challenges and recommendations." Journal of Cleaner Production., 2018, vol. 205, pp. 115-133.

Notification of Reexamination for CN Application No. 202080016298.9, dated Sep. 3, 2024, 24 pages with English translation.

Office Action and Search Report for CN Application No. 202080016298.9, dated Feb. 23, 2023, 24 pages. with English translation.

Office Action and Search Report for CN Application No. 202080016298.9, dated Jun. 13, 2023, 21 pages with English translation.

Office Action and Search Report for CN Application No. 202080016298.9, dated Sep. 2, 2022, 17 pages with English translation.

Office Action for CN Application No. 202080016298.9, dated Nov. 6, 2023, 21 pages with English translation.

Office Action for EP Application No. 20763945.1, dated Aug. 23, 2024, 4 pages.

Office Action for IN Application No. 202147034648, dated Apr. 1, 2024, 7 pages.

Partial European Search Report for EP Application No. 20763945.1, dated Oct. 4, 2022, 12 pages.

U.S. Final Office Action for U.S. Appl. No. 17/433,266, dated Mar. 28, 2023, 9 pages.

U.S. Final Office Action for U.S. Appl. No. 18/356,191, dated Nov. 1, 2024, 10 pages.

U.S. Non-Final Office Action for U.S. Appl. No. 17/433,266, dated Dec. 16, 2022, 9 pages.

U.S. Non-Final Office Action for U.S. Appl. No. 18/356,191, dated May 10, 2024, 10 pages.

Wang et al., "Battery Recycling Modeling," Argonne National Laboratory, Project ID # bat342, Jun. 19, 2018, 22 pages.

Office Action for U.S. Appl. No. 18/356,191, dated Apr. 24, 2025, 10 pages.

Office Action for U.S. Appl. No. 19/049,826, dated Apr. 17, 2025, 10 pages.

Office Action for U.S. Appl. No. 19/049,826, dated Aug. 20, 2025, 15 pages.

* cited by examiner

Figure 1:
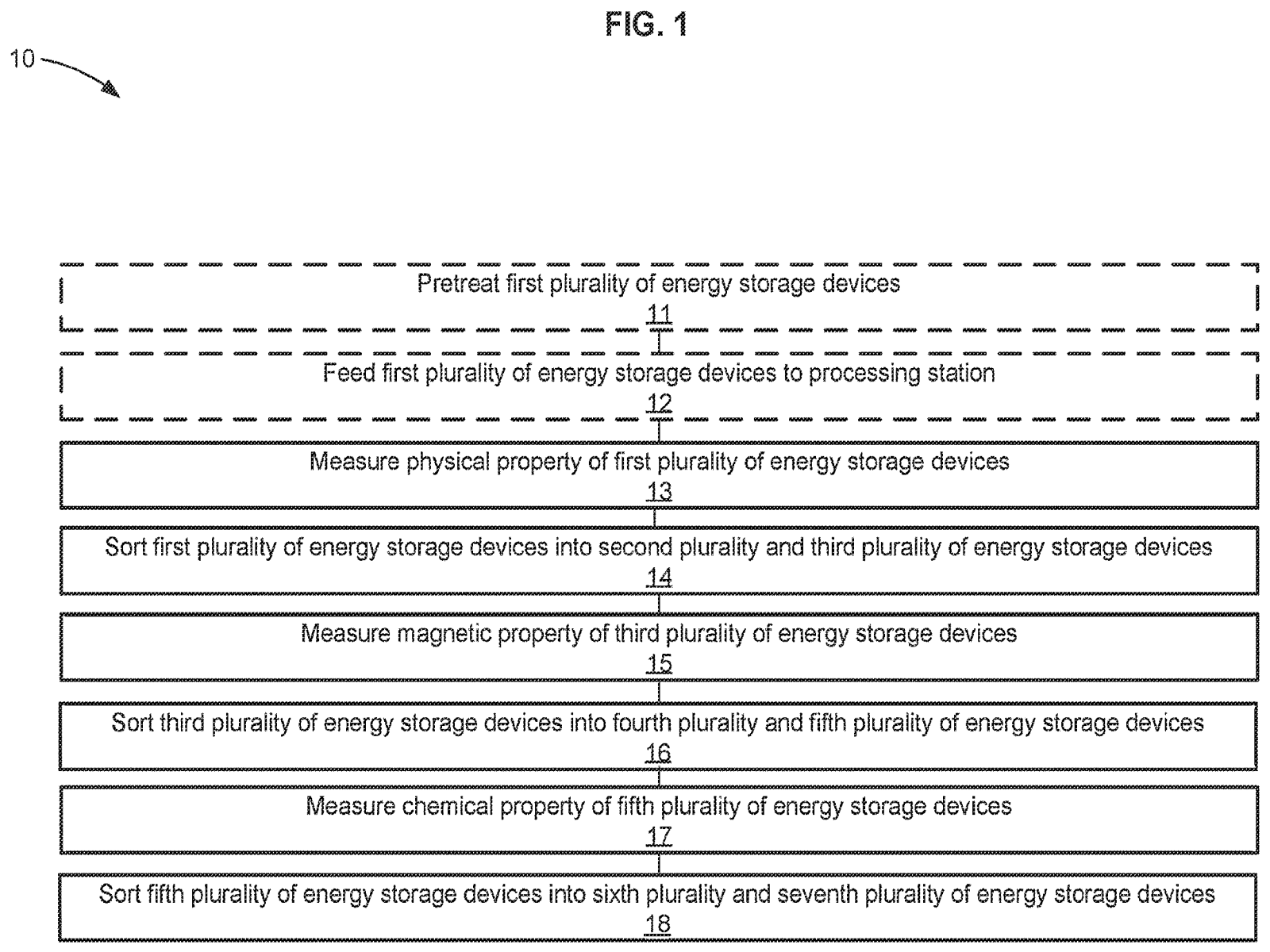

Pretreat first plurality of energy storage devices
11

Feed first plurality of energy storage devices to processing station
12

Measure physical property of first plurality of energy storage devices
13

Sort first plurality of energy storage devices into second plurality and third plurality of energy storage devices
14

Measure magnetic property of third plurality of energy storage devices
15

Sort third plurality of energy storage devices into fourth plurality and fifth plurality of energy storage devices
16

Measure chemical property of fifth plurality of energy storage devices
17

Sort fifth plurality of energy storage devices into sixth plurality and seventh plurality of energy storage devices
18

100
Information Recording Device 140
Chemical Sensing Device 130
Central Processing Unit 170
Magnetic Sensing Device 120
Physical Sensing Device 110
Feeding Subsystem 160
Pretreatment Subsystem 150

METHODS AND SYSTEMS FOR ADVANCED BATTERY COLLECTION, SORTING, AND PACKAGING

CROSS REFERENCE TO RELATED APPLICATIONS

This application is a Continuation of International Application No. PCT/US2023/070311, titled "Methods and Systems for Advanced Battery Collection, Sorting, and Packaging," and filed Jul. 17, 2023, and which claims priority to and the benefit of U.S. Provisional Application No. 63/368,732, titled "Methods and Systems for Advanced Battery Collection, Sorting, and Packaging," and filed Jul. 18, 2022, the disclosures of which are incorporated herein by reference in their entirety.

TECHNICAL FIELD

Embodiments described herein relate to apparatus, systems, and methods for collecting, sorting, and packaging energy storage devices.

BACKGROUND

End-of-life (EOL) energy storage devices, including lithium-ion batteries (LIBs) and other energy storage devices, can be sorted before the recycling or disposal process. Sorting the energy storage devices based on their chemistries (e.g., lithium-ion batteries, nickel-metal hydride batteries, nickel-cadmium batteries, etc.) can improve safety, efficiency, and economic outlook of the recycling and disposal operation. Sorting EOL LIBs based on material chemistries is beneficial for the direct recycling of EOL LIBs. Current energy storage device sorting devices are more specialized for non-LIBs and classify LIBs as a monolithic category in the sorting process. Existing sorting processes are often designed to sort a broad range of energy storage devices and have low efficiency in sorting LIBs.

SUMMARY

Embodiments described herein relate to methods of sorting energy storage devices. In some aspects a method can include measuring, via a physical sensing device, a physical property of a first plurality of energy storage devices. The method further includes sorting the first plurality of energy storage devices into a second plurality of energy storage devices and a third plurality of energy storage devices, delivering the second plurality of energy storage devices to a first location. The method further includes measuring, via a magnetic sensing device, a magnetic property of the third plurality of energy storage devices and sorting the third plurality of energy storage devices into a fourth plurality of energy storage devices and a fifth plurality of energy storage devices, delivering the fourth plurality of energy storage devices to a second location. The method further includes measuring, via a chemical sensing device, a chemical property of the fifth plurality of energy storage devices and sorting the fifth plurality of energy storage devices into a sixth plurality of energy storage devices and a seventh plurality of energy storage devices, delivering the sixth plurality of energy storage devices to a third location, and delivering the seventh plurality of energy storage devices to a fourth location.

BRIEF DESCRIPTION OF THE DRAWINGS

FIG. 1 is a flow diagram of a method of sorting energy storage devices, according to an embodiment.

DETAILED DESCRIPTION

Figure 2:
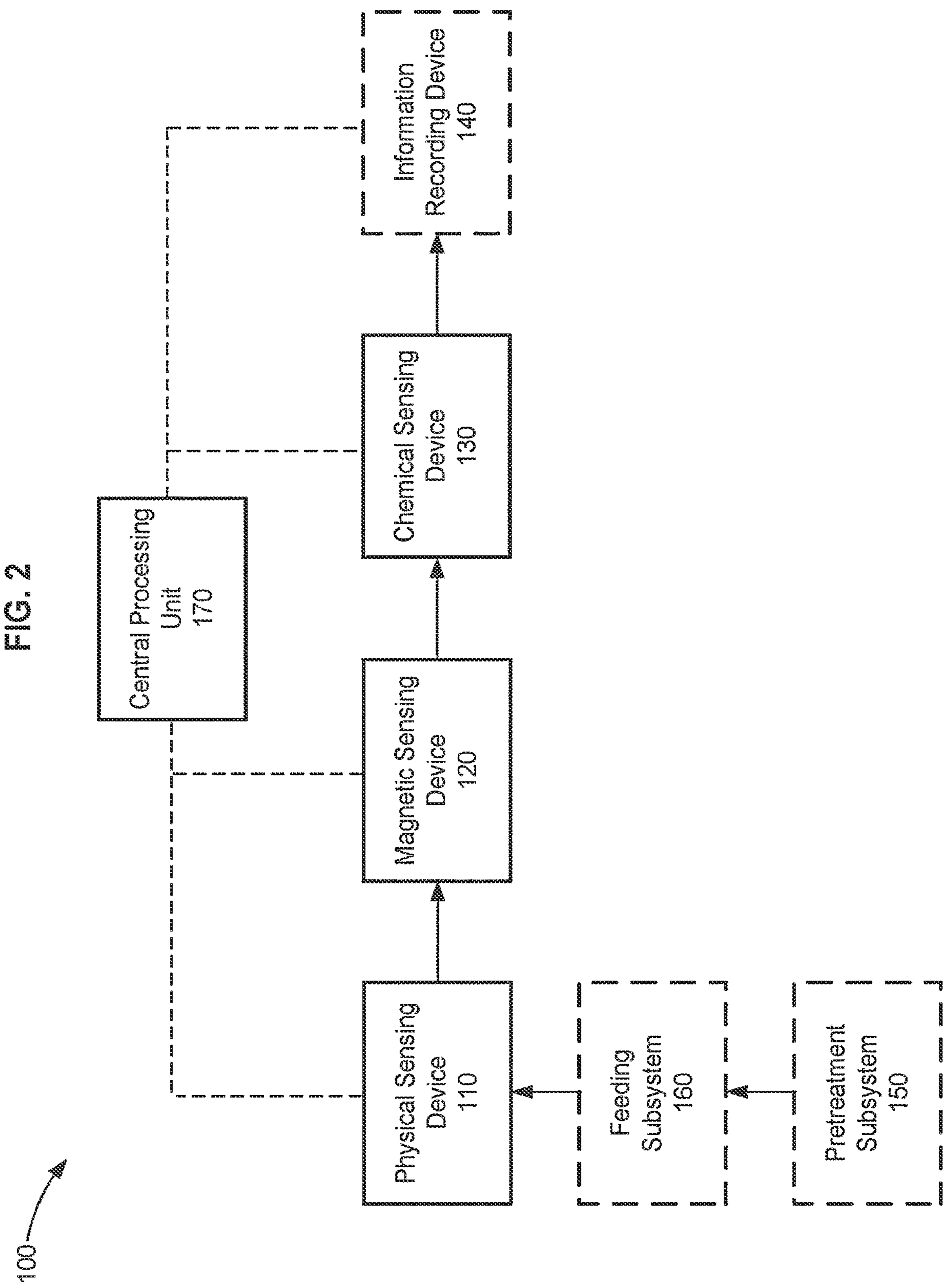
FIG. 2 is a block diagram of a system for sorting energy storage devices, according to an embodiment.

Embodiments described herein relate to systems and methods for sorting energy storage devices. Manual battery sorting processes often include trained personnel manually sorting different types of batteries delivered to them via a conveyor, or any other battery delivery system. In some cases, the trained personnel can sort the batteries twice—the first time based on a broad categorization (e.g., rubbish, LIBs, 6-volt, packs, lead, etc.) and the second time based on battery chemistry (e.g., nickel-metal-hydride (NiMH), nickel cadmium (NiCd), lithium-ion, or lithium). Such a process relies on the training and capability of personnel to identify and sort batteries in an accurate and efficient manner.

Some battery sorting processes can be more automated, and can include vision technology-assisted sorting. Such processes rely on vision technology and artificial intelligence to separate batteries based on their label, size, shape, and weight. These processes can have higher sorting efficiency and a higher accuracy rate than manual sorting and can identify cylindrical batteries up to D size and sort all 9V batteries into four classes: alkaline, NiMH, NiCd, and lithium. In addition, the vision technology helps with collecting data on batteries and feeding them into a machine learning process, which further optimizes the efficiency and accuracy of the sorting.

However, the aforementioned processes do not often address the specific needs of sorting particular to energy storage devices such as LIBs. Specifically, neither process can effectively separate energy storage devices based on their material chemistries. For example, the material chemistry of most LIBs is not easily identifiable from the label, size, shape, and/or weight of the battery itself. Moreover, even LIBs with the same type of material chemistry vary in shape and size. These differences in shape and size are nuanced, which presents challenges in relying solely on vision technology to sort. For some automated sorting technology, a chemical sensing device can be included. However, many energy storage devices covered with thick steel casings yield useful information about the casing materials and do not help with categorizing the energy storage devices.

These processes are also generally inadequate for many of the applications requiring sorting by the chemical composition of the energy storage device. A smart sorting method that effectively sorts energy storage devices based on their chemical compositions can facilitate the adoption of direct recycling as a primary approach for energy storage device recycling. For example, such a method can be employed for the recycling of LIBs. Direct LIB recycling can reduce the production cost of cathode materials and mitigate the negative environmental impact of current LIB recycling methods. The cost of producing recycled cathode materials through a direct recycling methods is estimated to be about 15% to about 43% lower than the production cost of virgin cathode materials. Dai, et al. *A Closed-loop Battery Recycling Cost and Environmental Impacts Model. Argonne National Laboratory* 2019. Aside from the improved economic benefits, direct LIB recycling can also have significantly lower $CO_2$ and $SO_x$ emissions than LIB recycling methods in the current state of the art (e.g., pyrometallurgical or hydrometallurgical methods).

Some embodiments described herein can include sorting systems and methods the same or substantially similar to those described in U.S. Patent Application No. 2022/0057345 ("the '345 application"), filed Aug. 24, 2021 and titled "Methods and Systems for Smart Battery Collection, Sorting, and Packaging," the disclosure of which is hereby incorporated by reference in its entirety.

FIG. 1 is a flow diagram of a method 10 of sorting energy storage devices, according to an embodiment. As shown, the method 10 optionally includes pretreating a first plurality of energy storage devices at step 11 and feeding the first plurality of energy storage devices to a processing station at step 12. The method 10 includes measuring a physical property of the first plurality of energy storage devices at step 13, sorting the first plurality of energy storage devices into a second plurality of energy storage devices and a third plurality of energy storage devices at step 14, measuring a magnetic property of the third plurality of energy storage devices at step 15, sorting the third plurality of energy storage devices into a fourth plurality of energy storage devices and a fifth plurality of energy storage devices at step 16, measuring a chemical property of the fifth plurality of energy storage devices at step 17, and sorting the fifth plurality of energy storage devices into a sixth plurality of energy storage devices and a seventh plurality of energy storage devices at step 18.

Step 11 is optional and includes pretreating the first plurality of energy storage devices. The pretreatment prepares the unsorted energy storage devices for the subsequent sorting process. In some embodiments, the pretreatment can facilitate more facile sorting via removal of various materials from the first plurality of energy storage devices. In some embodiments, the pretreatment can include the removal of labels or fragments of labels, protective coverings on the energy storage devices (e.g., cases, shells, wraps, boxes, adhesive materials, and/or other packaging materials). In some embodiments, the pretreatment can include removal of bags or tape from the energy storage devices. In some embodiments, the packaging materials, labels, fragments of labels, bags, or tape is cut via a blade on the conveyor and then removed from the energy storage devices. In some embodiments, the removal of the packaging materials, labels, fragments of labels, bags, or tape from the energy storage devices is performed manually or with a robotic arm. In some embodiments, the removal of the packaging materials, labels, fragments of labels, bags, or tape from the energy storage devices is performed via a shaker, siever, centrifugal separator, air classifier (which can include a vision system to identify packaging materials, labels, fragments of labels, bags, or tape from the energy storage devices), or other removal method, including those that separate based on size, density, weight, shape, or vision. In some embodiments, the pretreatment can include separating at least one energy storage device from the first plurality of energy storage devices from the other energy storage devices of the first plurality of energy storage devices. In some embodiments, the separation can be performed at a cell level, a pack level, or other unit or subunit of energy storage device. In some embodiments, the pretreatment can include separating the first plurality of energy storage devices from non-battery materials (e.g., glass, pieces of metal, plastic pieces). In some embodiments, the pretreatment can include sorting the first plurality of energy storage devices by weight, by shape, by color, or any other physical feature or combinations thereof. In some embodiments, the sorting the first plurality of energy storage devices during pretreatment can be performed via a shaker, siever, filter, size separator, centrifugal separator, air classifier, or other separation method, including those that separate based on size, density, weight, shape, or vision.

In some embodiments, the pretreatment can include the deactivation of the first plurality of energy storage devices. In some embodiments, the deactivation is performed via an ionically conductive aqueous or non-aqueous solvent to discharge the first plurality of energy storage devices. In some embodiments, the deactivation is performed via an electrically conductive aqueous or nonaqueous solvent to discharge the first plurality of energy storage devices. In some embodiments, the deactivation is performed via heating to induce self-discharge of the first plurality of energy storage devices. In some embodiments, the deactivation is performed via puncturing or cutting of the first plurality of energy storage devices. In some embodiments, the puncturing or cutting is performed under lower temperature and/or under the presence of an inert, non-oxidizing, or deactivating atmosphere, such as Ar, $N_2$, $CO_2$, CO, or a mixture thereof.

In some embodiments, the pretreatment can include cleaning the first plurality of energy storage devices. In some embodiments, the cleaning can include rinsing the first plurality of energy storage devices with an aqueous or non-aqueous solvent. In some embodiments, the cleaning can include scrubbing the first plurality of energy storage devices (e.g., with brushes, cloth, and/or sponges). In some embodiments, debris can be removed from the first plurality of energy storage devices via flowing air (e.g., pressurized air) along the plurality of energy storage devices. In some embodiments, debris can be removed from the first plurality of energy storage devices via a vacuum. In some embodiments, the pretreatment can be automated (i.e., requiring little or no human intervention). In some embodiments, non-energy storage device items collected from the pretreatment (e.g., packaging) can be recovered for later use. In some embodiments, non-energy storage device items collected from the pretreatment can be disposed or discarded. In some embodiments, the method 10 can be performed without the pretreatment of step 11. In some embodiments, the method 10 can include multiple pretreatment operations at step 11 (e.g., cleaning and packaging removal).

Step 12 is optional and includes feeding the first plurality of energy storage devices to a processing station (e.g., a physical property sorting subsystem, as employed in step 13). In some embodiments, the feeding can be performed manually (i.e., an operator can physically place the plurality of energy storage devices in the subsystem for further processing). In some embodiments, the feeding can be via an automated device. In some embodiments, the feeding can be via a robotic arm, a pusher, a conveyor belt, or a combination thereof. In some embodiments, the feeding can be assisted by a vision system to aid in the singulation and/or feeding of the first plurality of energy storage devices. In some embodiments, a shaker or vibration device can form the first plurality of energy storage devices into a consecutive arrangement or singulate the first plurality of energy storage devices. In some embodiments, the feeding can be via an elevator conveyor. In some embodiments, the feeding can be continuous. In some embodiments, the feeding can be discontinuous. In some embodiments, the method 10 can be performed without the feeding of step 12. In some embodiments, the method 10 can include multiple feeding operations at step 12 (e.g., manual placement and then automated conveyance). In some embodiments, different pretreatment steps (i.e., step 11) and feeding steps (i.e., step 12) can be placed before or after one another. In some embodiments, pretreatment and/or feeding steps can be placed between other sorting steps (e.g., step 14, step 16 step 18).

Step 13 includes measuring a physical property of the first plurality of energy storage devices. In some embodiments, the measurement of the physical property can be via an optical sensing device (e.g., a camera or an infrared scanner). In some embodiments, the camera can be in communication with vision software. The vision software can recognize patterns in the first plurality of electrochemical cells and sort appropriately. In some embodiments, the physical property measured at step 13 can include written information on the surface of the first plurality of energy storage devices. In some embodiments, the written information can be measured via optical character recognition (OCR) software. In some embodiments, step 13 can include measuring at least one physical dimension of the first plurality of energy storage devices. In some embodiments, step 13 can include visually recording the color of the first plurality of energy storage devices. In some embodiments, step 13 can include visually recording visual information on the surface of the first plurality of energy storage devices. In some embodiments, the visual information can include a radio frequency identification (RFID) code, a barcode, a serial code, or written or pictorial labels detailing manufacturer, material, chemistry, format, year of manufacture, or location of origin, or a combination thereof. In some embodiments, step 13 can include uploading collected physical data to a central processing unit (CPU). In some embodiments, the CPU can generate instructions to sort the first plurality of energy storage devices based on the patterns or written information collected at step 13. In some embodiments, the physical property of the first plurality of energy storage devices can be measured while the first plurality of energy devices are moving along a conveyor.

In some embodiments, the CPU can utilize optical character recognition software that matches collected written information from the energy storage device to at least one keyword. In some embodiments, a keyword can include at least one word, phrase, number, symbol, or a combination thereof (which can include any of the above connected by one or more dashes, colons, semicolons, ellipsis, and/or parentheses) and can be uppercase or lowercase. The at least one keyword can be placed in a ranking system that ranks the priority of the sorting decisions made from the at least one keyword. In some embodiments, the at least one keyword can be assigned a point value or rank level to be used in a ranking system Based on the point value of each possible sorting decision, the ranking system ranks the priority of the sorting decisions. The output sorting decision can be based on the preferred sorting decision based on the ranking of sorting decisions.

In some embodiments, the at least one keyword can include the chemistry or type of energy storage device, the rechargeability of the energy storage device, and/or the nominal voltage of the energy storage device. In some embodiments, the at least one keyword can include the full chemistry or type name (or common abbreviation) of the energy storage device (also referred to as "definitive chemistry"). For example, the at least one keyword can include "alkaline", "lead acid", "Li-ion", "lithium ion", "Ni-MH", "nickel metal hydride", "Ni—Cd", "nickel cadmium", "lithium primary", "lithium cobalt oxide", "LCO", "lithium iron phosphate", "LFP", "lithium nickel manganese cobalt oxide", "NMC", "lithium nickel cobalt aluminum oxide", "NCA", "lithium manganese oxide", "LMO", and/or other similar names. In some embodiments, the at least one keyword can include a partial chemistry or type name of the energy storage device (also referred to as "partial chemistry"). For example, the at least one keyword can include "mercury", "cadmium", "Pb", "lead", "Li", "lithium", "metal", "acid", "ion", "Ni", "nickel", "Co", "cobalt", "hydride", or other similar partial chemistry or type word. In some embodiments, the at least one keyword can include a combination of two or more partial chemistry or definitive chemistry words (also referred to as "combined chemistry"). For example, the at least one keyword can include a combination of "mercury" and "cadmium", a combination of "lead" and "acid", a combination of "Pb" and acid", a combination of "lithium" and "ion", a combination of "Li" and "ion", an combination of "Ni" and "metal", a combination of "nickel" and metal", a combination of "Ni" and "hydride", a combination of "nickel" and "hydride", and/or any other similar combination of definitive chemistry or partial chemistry words. In some embodiments, the at least one keyword includes at least one word referencing the rechargeability of the energy storage device. For example, the at least one keyword can include "rechargeable", "non-rechargeable". "do not recharge", "don't recharge", "not recharge", "not rechargeable", or other similar word or phrase. In some embodiments, the at least one keyword includes the nominal voltage of the energy storage device. For example, the at least one keyword can include "1.2 V", "9 V", "11.2 V", "3.7 V", "1.5 V", "1.2 volts", "9 volts", "11.2 volts", "3.7 volts", "1.5 volts", and/or any other similar or common voltage for energy storage devices. In some embodiments, the nominal voltage can include a definitive voltage that only belongs to a specific chemistry or type of energy storage device. In some embodiments, the nominal voltage can include a partial voltage that belongs to more than one chemistry or type of energy storage device.

In some embodiments, the OCR system utilizes a method to approximately match keywords that are similar but not exactly matching the collected written information of the energy storage device. In some embodiments, the OCR can employ a fuzzy matching or fuzzy logic method. In some embodiments, the OCR system can utilize a technique involving the measurement of Levenshtein distance, Hamming distance, Damerau-Levenshtein distance, character overlap measures, N-Gram edit distance, Bitap, Jaro-Winkler, strike a match, weighted edit distance, Burkhard-Keller tree, SymSpell, Linspell, and/or other similar technique.

In some embodiments, the at least one keyword forms a database of keywords that is categorized and used to match with the output of the OCR system for a sorting decision. Based on the category of the matched keyword (e.g., definitive chemistry, combined chemistry, partial chemistry, rechargeability, definitive voltage, or partial voltage) or a combination of categories of the matched keywords, a ranking level is assigned. Table 1 shows an embodiment of a ranking system for the combination of a set of keyword categories for a sorting decision. In this embodiment, the lower rank level represents the ranking with the higher sorting decision priority. In some embodiments, the matched keyword categories of a sorting decision for an energy storage device matches exactly with one of the rank levels. For example, in Table 1, if the matched keyword categories are both definitive chemistry and rechargeability, then the rank level of a sorting decision is 5. In some embodiments, the matched keyword categories of a sorting decision for an energy storage device includes the keyword category set of only one rank level. For example, in Table 1, if the matched keyword combination of a sorting decision is definitive chemistry and definitive voltage, then the rank level is 1. In some embodiments, the matched keyword categories of a sorting decision for an energy storage device includes the keyword category of more than one rank level. In that case, the rank level with the highest priority should be used. For example, in Table 1, if the matched keyword categories of a sorting decision is definitive chemistry and partial voltage, and the rank level can be 2 and 7. In that case, the rank level 2 should be used. In some embodiments, one energy storage device has more than one sorting decision based on the output of the OCR system. The sorting decision with the highest priority rank level can be used as the final sorting decision to sort the energy storage device. For example, in Table 1, if, based on the OCR output for the energy storage device, a "Li-ion" sorting decision is made with a rank level of 2 and an "alkaline" sorting decision is also made with a rank level of 7, then the final sorting decision should be "Li-ion". In some embodiments, one energy storage device has more than one sorting decision made at the same rank level. In those embodiments, an "unsorted" decision, or similar decision, can be made. For example, in Table 1, based on the OCR output for the energy storage device, if a "Li-ion" sorting decision is made with a rank level of 2 and an "alkaline" sorting decision is also made with a rank level of 2, then the final decision can be "unsorted".

TABLE 1

An embodiment of a ranking system for OCR keywords

| Rank | Chemistry | | | Recharge- | Voltage | |
|---|---|---|---|---|---|---|
| level | Definitive | Combined | Partial | ability | Definitive | Partial |
| 1 | | | | | X | |
| 2 | X | | | | | X |
| 3 | | X | | | | X |
| 4 | | | X | | | X |
| 5 | X | | | X | | |
| 6 | | X | | X | | |
| 7 | X | | | | | |
| 8 | | X | | | | |
| 9 | | | X | X | | |
| 10 | | | X | | | |

In some embodiments, step 13 can include measuring electromagnetic radiation of the first plurality of energy storage devices in the X-ray range. In such embodiments, an X-ray-detecting camera can visually record patterns or components under the surface of the first plurality of energy storage devices. These patterns or components can be patterns or components not detectible in the visible spectrum. In some embodiments, step 13 can include measuring electromagnetic radiation of the first plurality of energy storage devices in the infrared range. In some embodiments, step 13 can include measuring electromagnetic radiation from the first plurality of energy storage devices in the X-ray, infrared, and/or visible spectra. In some embodiments, a combination of cameras detecting electromagnetic radiation in the X-ray, infrared, and/or visible spectra can be used. In some embodiments, step 13 can include laser-based 3-dimensional scanning of the first plurality of energy storage devices in order to visually record 3-dimensional patterns of the first plurality of energy storage devices.

In some embodiments, step 13 can include measuring the mass of the first plurality of energy storage devices. In some embodiments, the mass data can be fed to the CPU and the first plurality of energy storage devices can be classified based on their mass. In some embodiments, the mass data can be classified to determine whether an item includes an energy storage device or not (e.g., below a predefined mass threshold, the item is considered a non-energy storage device and is discarded or otherwise reused). In some embodiments, step 13 can be executed while the first plurality of energy storage devices is advancing along a conveyor. In some embodiments, the CPU can send instructions to the conveyor to sort based on the physical data collected at step 13.

In some embodiments, step 13 can include measuring the physical dimensions and/or shape of the first plurality of energy storage devices. In some embodiments, the sensing of the physical dimensions and/or shape of the first plurality of energy storage devices can be via a laser-based sensor to measure the distance between the sensor and an energy storage device from at least one direction. The distance measurement can be used to infer the dimensions and/or shape of the energy storage device. In some embodiments, step 13 can include the use of acoustic waves to measure the distance from a sensor to the energy storage device in at least one direction. In some embodiments, step 13 can include other distance-measuring methods, such as optical methods (e.g., edge detection), physical methods (e.g., measuring using a device that can physically mark travelled distance), or electromagnetic methods (e.g., measure and map the electrical or magnetic properties or the emission spectra of the energy storage device to determine position). In some embodiments, the physical dimensions and/or shape of an energy storage device can be combined with the recorded mass information to generate a pressure mapping.

Step 14 includes sorting the plurality of energy storage devices into a second plurality and a third plurality of energy storage devices. The sorting at step 14 is based on the physical property measured at step 13. In some embodiments, the sorting at step 14 can be conducted based on the patterns or written information collected from the visual information retrieved at step 13. Visual information collected at step 13 can be compared across the first plurality of energy storage devices and sorting instructions can be based on the visual information. In some embodiments, the visual information collected at step 13 can be compared to reference visual information (e.g., a database of known visual information standards). In some embodiments, the reference visual information can be derived from sources, such as public databases, previously collected databases of known samples, predictive algorithms, or other predictive or correlative software. In some embodiments, the first plurality of energy storage devices are separated based on the physical data collected at step 13. In some embodiments, the first plurality of energy storage devices can be sorted based on the information provided by the physical sensing at step 13. In some embodiments, the second plurality of energy storage devices can be delivered to a location, while the third plurality of energy storage devices is further processed (e.g., via step 15). For example, the second plurality of energy storage devices can be delivered to a storage space specifically designated for energy storage devices categorized consistently with the second plurality of energy storage devices, or to another processing facility for recycling, reuse, or further sorting. In some embodiments, the second plurality of energy storage devices can be further processed (e.g., via step 15), but maintained separate from the third plurality of energy storage devices.

Step 15 includes measuring a magnetic property of the third plurality of energy storage devices. In some embodiments, step 15 can also include measuring a magnetic property of the second plurality of energy storage devices. In some embodiments, the magnetic property can include the attraction or repulsion of the third plurality of energy storage devices to a magnet. In some embodiments, the magnet can include a permanent magnet. In some embodiments, the magnet can include an electromagnet. In some embodiments, the magnet can include a ferromagnet. In some embodiments, step 15 can include detecting whether the third plurality of energy storage devices are fully covered in a magnetic material (i.e., materials that are attracted to or repelled by a magnet, which primarily comprise of ferromagnetic materials but can include other types of magnetic materials), partially covered by magnetic materials, or not covered by magnetic materials (i.e., covered instead by materials that are not attracted or repelled or weakly attracted or repelled by a magnet) based on the magnetic information acquired at step 15. In some embodiments, step 15 can include eddy current separation. In some embodiments, step 15 can include measuring force (e.g., via a force transducer). For example, the magnetic properties of the third plurality of energy storage devices can be measured and recorded based on the magnetic force produced when the third plurality of energy storage devices is in magnetic contact with the magnetic device.

In some embodiments, the measured magnetic properties are mapped onto the shape of an energy storage device, which can be further analyzed to determine additional characteristics of the energy storage device or identify each of third plurality of energy storage devices for sorting. In some embodiments, step 15 can include mapping the shape of each of the third plurality of energy storage devices via a vision system, a force sensor grid system, or other system that can determine the shape of the energy storage device. In some embodiments, the mapping is performed with information gathered from at least one one-dimensional section of the energy storage device. The at least one one-dimensional section can be individually analyzed or grouped together with at least one other one-dimensional section to be analyzed. In some embodiments, the mapping is performed with information gathered from at least one two-dimensional section of the energy storage device. The at least one two-dimensional section can be individually analyzed or grouped together with at least one other two-dimensional section to be analyzed.

Step 16 includes sorting the third plurality of energy storage devices into a fourth plurality of energy storage devices and a fifth plurality of energy storage devices. The sorting at step 16 is based on the magnetic property measured at step 15. In some embodiments, the magnetic information collected at step 15 can be compared across the third plurality of energy storage devices and sorting instructions can be based on the magnetic information. In some embodiments, the magnetic information collected at step IS can be compared to reference magnetic information. In some embodiments, the reference magnetic information can be derived from sources, such as public databases, previously collected databases of known samples, predictive algorithms, or other predictive or correlative software.

In some embodiments, a magnetic device (i.e., the device used at step 15) can physically separate the fourth plurality of energy storage devices from the fifth plurality of energy storage devices. For example, the fourth plurality of energy storage devices can be drawn to the magnetic device while the fifth plurality of energy storage devices can be repelled by the magnetic device. In some embodiments, the fourth plurality of energy storage devices can be separated from the fifth plurality of energy storage devices via a sorting device, such as a robotic arm. In some embodiments, the fourth plurality of energy storage devices can be delivered to a location, while the fifth plurality of energy storage devices is further processed (e.g., via step 17). For example, the fourth plurality of energy storage devices can be delivered to a storage space specifically designated for energy storage devices categorized consistently with the fourth plurality of energy storage devices. In some embodiments, the fourth plurality of energy storage devices can be further processed (e.g., via step 17), but maintained separate from the fifth plurality of energy storage devices.

In some embodiments, the third plurality of energy storage devices are sorted by a magnetic sensing device. In some embodiments, the fourth plurality of energy storage devices and/or the fifth plurality of energy storage devices are rerouted to the next sensing device for further detecting and classification via a rerouting device or other energy storage device delivery system. In some embodiments, the rerouting can be determined by analysis of data received from the magnetic sensing device, the physical sensing device, or any combination thereof by the CPU. The CPU can generate an instruction to reroute one or more energy storage devices.

Step 17 includes measuring a chemical property of the fifth plurality of energy storage devices. In some embodiments, the chemical property of the fifth plurality of energy storage devices can be measured via irradiation of an input radiation characterized by a first electromagnetic spectrum. In some embodiments, step 17 can include detecting (i.e., via a detector) an output radiation reflected or backscattered by each for the fifth plurality of energy storage devices. In some embodiments, the CPU can determine a second electromagnetic spectrum of the output radiation and compare the second electromagnetic spectrum with a reference electromagnetic spectrum. The CPU can also generate an instruction to sort each of the fifth plurality of energy storage devices based on a comparison of the second electromagnetic spectrum with the reference electromagnetic spectrum. In some embodiments, the routing of each of the energy storage devices can be determined by analysis of data received from a chemical sensing device, a magnetic sensing device (i.e., from step 15), a physical sensing device (i.e., from step 13), or any combination thereof by the CPU, which can generate a sorting instruction for each of the fifth plurality of cells. In some embodiments, the chemical property of the fifth plurality of energy storage devices can be measured while the fifth plurality of energy storage devices is advanced along a conveyor.

In some embodiments, the chemical property can be measured via X-ray fluorescence (XRF) spectroscopy. XRF spectroscopy uses X-rays generated from an excited source to irradiate a target. The target responds through the emission of X-ray spectra characteristic to certain chemical compositions. The X-ray spectra can be compared to the X-ray spectra of known chemical compositions to determine the chemical composition of the target. The penetration depth of X-rays can be large enough to penetrate through surface coatings, coverings, or other materials on the outside of each of the energy storage devices. This can enable identification of the chemical composition of the material of energy storage devices beneath coatings, coverings, or other surface material.

In some embodiments, step 17 can include absorption spectroscopy measurement. In some embodiments, step 17 can include ultraviolet-visible spectroscopy measurement. In some embodiments, step 17 can include X-ray absorption spectroscopy measurement. In some embodiments, step 17 can include energy-dispersive X-ray spectroscopy measurement. In some embodiments, step 17 can include photoemission spectroscopy measurement (e.g., X-ray photoelectron spectroscopy and/or ultraviolet photoelectron spectroscopy). In some embodiments, step 17 can include projectional radiography measurement via X-ray addition. In some embodiments, step 17 can include computed tomography (CT) measurement. In some embodiments, step 17 can include a Raman spectroscopy measurement. In some embodiments, step 17 can include any of the aforementioned measurements on non-magnetic sites of each of the fifth plurality of energy storage devices. In some embodiments, step 17 can include any of the aforementioned measurements on multiple sites of each of the fifth plurality of energy storage devices. In some embodiments, step 17 can include locating each of the fifth plurality of energy storage devices via mechanical positioning (e.g., one- or two-dimensional centering of the energy storage devices), a vision system, or other detection system (e.g., force/mass detector, magnetic detector, acoustic detector).

Step 18 includes sorting the fifth plurality of energy storage devices into a sixth plurality of energy storage devices and a seventh plurality of energy storage devices. The sorting at step 18 is based on the chemical property measured at step 17. In some embodiments, the sixth plurality of energy storage devices can be delivered to a first location and the seventh plurality of energy storage devices can be delivered to a second location. In some embodiments, the sixth plurality of energy storage devices and/or the seventh plurality of energy storage devices can be subject to further processing (e.g., further physical/magnetic/chemical characterization) while being kept isolated from each other.

In some embodiments, the method 10 can include post-treatment on the sorted energy storage devices. In some embodiments, post-treatment includes packing a single energy storage device. In some embodiments, post-treatment includes packing a group (e.g., boxes, cases, bags, drums) of sorted energy storage devices. In some embodiments, post-treatment includes feeding protective materials (e.g., flame-retardant materials, cushioning materials, physically or electrically isolating materials) or other packaging materials (e.g., bags, tape, adhesives, boxes) to the sorted energy storage devices. In some embodiments, packaged energy storage devices can be arranged for shipping, such as on a pallet cart, box, or other typical shipping arrangement. In some embodiments, the post-treatment can include physically or electronically recording properties of the energy storage device, such as weight, batch number, origin, type, etc. In some embodiments, the post-treatment can be performed automatically. In some embodiments, the post-treatment can include feeding additional information to the CPU.

In some embodiments, the first plurality of energy storage devices, the second plurality of energy storage devices, the third plurality of energy storage devices, the fourth plurality of energy storage devices, the fifth plurality of energy storage devices, the sixth plurality of energy storage devices, and/or the seventh plurality of energy storage devices can include at least about 1, at least about 2, at least about 3, at least about 4, at least about 5, at least about 6, at least about 7, at least about 8, at least about 9, at least about 10, at least about 20, at least about 30, at least about 40, at least about 50, at least about 60, at least about 70, at least about 80, at least about 90, at least about 100, at least about 200, at least about 300, at least about 400, at least about 500, at least about 600, at least about 700, at least about 800, or at least about 900 energy storage devices. In some embodiments, the first plurality of energy storage devices, the second plurality of energy storage devices, the third plurality of energy storage devices, the fourth plurality of energy storage devices, the fifth plurality of energy storage devices, the sixth plurality of energy storage devices, and/or the seventh plurality of energy storage devices can include no more than about 1.000, no more than about 900, no more than about 800, no more than about 700, no more than about 600, no more than about 500, no more than about 400, no more than about 300, no more than about 200, no more than about 100, no more than about 90, no more than about 80, no more than about 70, no more than about 60, no more than about 50, no more than about 40, no more than about 30, no more than about 20, no more than about 10, no more than about 9, no more than about 8, no more than about 7, no more than about 6, no more than about 5, no more than about 4, no more than about 3, or no more than about 2 energy storage devices. Combinations of the above-referenced numbers of energy storage devices are also possible (e.g., at least about 1 and no more than about 1,000 or at least about 40 and no more than about 400), inclusive of all values and ranges therebetween. In some embodiments, the first plurality of energy storage devices, the second plurality of energy storage devices, the third plurality of energy storage devices, the fourth plurality of energy storage devices, the fifth plurality of energy storage devices, the sixth plurality of energy storage devices, and/or the seventh plurality of energy storage devices can include about 1, about 2, about 3, about 4, about 5, about 6, about 7, about 8, about 9, about 10, about 20, about 30, about 40, about 50, about 60, about 70, about 80, about 90, about 100, about 200, about 300, about 400, about 500, about 600, about 700, about 800, about 900, or about 1,000 energy storage devices.

As described above, each of steps 14, 16, and 18 sort the pluralities of energy storage devices into two different subsets and the subsets are fed to two separate locations. In some embodiments, steps 14, 16, and 18 can sort the pluralities of energy storage devices into multiple subsets that can be routed to more than two possible locations (e.g., three locations, four locations, five locations, six locations, seven locations, eight locations, nine locations, ten locations, or more).

Any order of the aforementioned steps is possible. For example, the energy storage devices can be sorted by their physical properties, their magnetic properties, and then by their chemical properties. In some embodiments, the energy storage devices can be sorted by their physical properties, their chemical properties, and then by their magnetic properties. In some embodiments, the energy storage devices can be sorted by their magnetic properties, their physical properties, and then by their chemical properties. In some embodiments, the energy storage devices can be sorted by their magnetic properties, their chemical properties, and then their physical properties. In some embodiments, the energy storage devices can be sorted by their chemical properties, their physical properties, and then their magnetic properties. In some embodiments, the energy storage devices can be sorted by their chemical properties, their magnetic properties, and then their physical properties.

FIG. 2 is a block diagram of a system 100 for sorting energy storage devices, according to an embodiment. As shown, the system 100 includes a physical sensing device 110, a magnetic sensing device 120, and a chemical sensing device 130. The system 100 optionally includes an information recording device 140, a pretreatment subsystem 150, and a feeding subsystem 160. The system 100 further includes a central processing unit (CPU) 170. In use, a plurality of energy storage devices optionally passes through the pretreatment subsystem 150 and the feeding subsystem 160. The plurality of energy storage devices is then processed via the physical sensing device 110, the magnetic sensing device 120, and the chemical sensing device 130. The plurality of energy storage devices is optionally processed via the information recording device 140.

The pretreatment subsystem 150 can subject a plurality of energy storage devices to any of the processes described above in step 11 with reference to FIG. 1. In some embodiments, the pretreatment subsystem 150 includes at least one conveyor. In some embodiments, the conveyor includes at least one blade for packaging removal. In some embodiments, the pretreatment subsystem 150 includes automation components such as a robotic arm. In some embodiments, the pretreatment subsystem 150 includes a shaker, siever, centrifugal separator, air classifier, deactivation tank, puncturing or cutting mechanism, furnace or heater, or gas flow inlets and outlets. In some embodiments, the pretreatment subsystem 150 can be coated in a flame-retardant material. The feeding subsystem 160 is optional and feeds the plurality of energy storage devices from the pretreatment subsystem 150 to the physical sensing device 110. In some embodiments, the feeding subsystem 160 can include a robotic arm, a pusher, a conveyor belt, or any combination thereof.

The physical sensing device 110 detects physical properties of the energy storage devices. In some embodiments, the physical sensing device 110 can include any of the instrumentation and can perform any of the tasks associated with step 13, as described above with reference to FIG. 1. In some embodiments, the physical sensing device 110 can include a camera. In some embodiments, the camera is able to capture the visual information of the energy storage device while it is moving (e.g., energy storage devices with cylindrical shapes) on a conveyor or other similar battery transfer mechanism. In some embodiments, the camera can move with more than one degree of freedom. In some embodiments, the camera can focus on the energy storage device automatically. In some embodiments, the physical sensing device 110 can include more than one camera (e.g., about 2, about 3, about 4, about 5, about 6, about 7, about 8, about 9), about 10, or at least about 10 cameras, inclusive of all values and ranges therebetween). In some embodiments, multiple cameras are equipped to capture the visual information of the energy storage device from more than one angle. In some embodiments, the multiple cameras are equipped to capture the visual information of the energy storage device from multiple angles in such a way to enable the capture and/or analysis of most or all visual information of concern on the energy storage device. In some embodiments, the physical dimensions and/or shape of an energy storage device can be provided to the magnetic sensing device 120 to make a sorting decision.

In some embodiments, the magnetic sensing device 120 can include any of the instrumentation or perform any of the tasks associated with step 15, as described above with reference to FIG. 1. In some embodiments, the magnetic sensing device 120 can physically sort the energy storage devices. In some embodiments, the magnetic sensing device 120 can include a magnet that is connected to a force transducer or other force measuring device. In some embodiments, the magnetic properties of the energy storage device can be recorded in terms of magnetic forces. In some embodiments, the magnetic sensing device 120 can include a magnet and/or a magnetic sensor. In these embodiments, the magnetic field generated by the magnet is affected by any magnetic energy storage devices and the changes in the magnetic field are measured by the magnetic sensor. In some embodiments, the magnetic sensing device 120 can include at least one distance sensor (e.g., a laser-based sensor, a mass sensor, an optical sensor, or any of the sensors described herein or combinations thereof) that records the shape of the energy storage device as it moves through the magnetic sensing device 120.

In some embodiments, the chemical sensing device 130 can include any of the instrumentation or perform any of the tasks associated with step 17, as described above with reference to FIG. 1. In some embodiments, the chemical sensing device 130 can be placed in a fixed position and the energy storage devices can be centered to the chemical sensing device 130. In some embodiments, the chemical sensing device 130 can move towards the energy storage device and sense its chemical composition. In some embodiments, the chemical sensing device 130 can move alongside a moving energy storage device conveyed on a conveyor or other energy storage device delivery system to collect data without stopping the conveyance of the energy storage device.

The CPU 170 receives information from the physical sensing device 110, the magnetic sensing device 120, and the chemical sensing device 130. In some embodiments, the CPU 170 can generate instructions that are sent to a rerouting device (also referred to as a sorting device), which is configured to implement the instruction and sort the energy storage devices into different locations.

In some embodiments, the system 100 can include an information recording device 140. The information recording device 140 collects, packs, and uploads information about each of the energy storage devices before and after sorting. The information recording device 140 can also be used to reroute energy storage devices from one location or conveyor to another. In some embodiments, all or part of the data collected by the information recording device 140 can be disposed before or at each of the pretreatment subsystem 150, the feeding subsystem 160, the physical sensing device 110, the magnetic sensing device 120, and/or the chemical sensing device 130. In some embodiments, all or part of the data collected by the information recording device 140 can be disposed at or after each of the pretreatment subsystem 150, the feeding subsystem 160, the physical sensing device 110, the magnetic sensing device 120, and/or the chemical sensing device 130. In some embodiments, the information recording device 140 can include mass sensors, distance sensors, and/or cameras to collect the information about the energy storage devices before and after sorting. In some embodiments, the information recording device 140 can automatically process the collected information and upload it to a server. The server can be local or remote (e.g., including cloud-based). In some embodiments, the information recording device 140 can record identifying information, such as frequency identification code, barcode, serial code, manufacturer, material, chemistry, format, year of manufacture, location of origin, retail location, consumer location, collection location, shipping intermediate locations, shipping destination: process information, such as sorting decision, sorting algorithm used, sorting certainty metrics, information collected by any of the sorting devices (e.g., visual information, weight, magnetic properties, chemical properties), timestamp, sorting conditions, process exceptions or errors, serial number, or batch number: or other operational information, such as sorting statistics and information, financial statistics and information (including charges or revenue generated), operator statistics and information (including operator information, time spent or worked, or time during shift), or packaging materials information. In some embodiments, the server is either local or remote (including cloud-based).

In some embodiments, the system 100 includes at least one conveyor (not shown) to transport the energy storage devices and facilitate the sorting process. In some embodiments, the at least one conveyor can operate at a capacity of about 1, about 2, about 3, about 4, about 5, about 6, about 7, about 8, about 9, about 10, about 20, about 30, about 40, about 50, about 60, about 70, about 80, about 90, about 100, about 200, about 300, about 400, about 500, about 600, about 700, about 800, about 900, or about 1,000 batteries per minute, inclusive of all values and ranges therebetween. In some embodiments, two or more conveyors can operate at different rates. These different rates can be used to accommodate different quantities of batteries that can be routed to these conveyors.

In some embodiments, any of the conveyors can receive instructions from the CPU 170 to adjust speed and efficiently sort the energy storage devices. In some embodiments, a conveyor belt can slow down or hold at a position to wait for the information from other sensing and detecting devices (e.g., physical sensing devices, magnetic sensing devices, chemical sensing devices). In some embodiments, the conveyor belt increases its speed when other sensing and detecting devices are idling.

In some embodiments, energy storage devices are rerouted to one or more additional sorting systems to be further classified into categories. The additional sorting systems can utilize one or a combination of sensing devices described above to further identify and sort the energy storage device into categories. In some embodiments, an initial sorting system can sort energy storage devices into one set of categories and a secondary sorting system can further sort energy storage devices into another set of categories. In some embodiments, a third and/or fourth sorting system can further sort energy storage devices into another set of categories. In some embodiments, a sorting system can sort batteries by certain types, such as lead acid, NiMH, NiCd, LIB, Li primary, alkaline, and also sort out non-battery materials. In some embodiments, a secondary sorting system can sort LIBs by chemistries, such as various chemistries and compositions of lithium cobalt oxide (also referred to as $LiCoO_2$ or LCO), lithium nickel cobalt manganese oxide (also referred to as $LiNi_xMn_yCo_zO_2$ where x+y+z=1, or NCM), lithium nickel cobalt aluminum, lithium iron phosphate (including $LiFe_tM_{1-t}PO4$, where M=Mn, Ni, Co. V or metal elements, or a combination of several metal elements, and also referred to as LFP), and lithium manganese oxide (also referred to as $LiMn_2O_4$ or LMO), or some combination thereof. In some embodiments, another sorting system can be used to separate batteries from non-battery materials. In some embodiments, one sorting system can sort some or all of the abovementioned types of batteries, non-battery materials, and battery chemistries.

In some embodiments, at least one rerouting device operates with a pusher (which also encompasses any physical redirecting mechanism or device to relocate an energy storage device from one position in the sorting system to another) to route the energy storage devices to a collecting location or to another conveyor belt. In some embodiments, the at least one pusher is pneumatic. In some embodiments, the at least one pusher can be hydraulic. In some embodiments, the at least one pusher utilizes a motor to push the energy storage device. In some embodiments, the rerouting device also includes conveyors to transfer the energy storage devices to desired locations.

In some embodiments, post-treatment can be performed on the sorted energy storage devices. In some embodiments, post-treatment can be performed at any of the locations post-sorting. In some embodiments, the system 100 can include at least one safety monitoring device (not shown) to monitor the condition of the energy storage device or system. In some embodiments, the system 100 includes at least one safety monitoring device to monitor the energy storage devices in more than one location. In some embodiments, the at least one safety monitoring device can send alarm notifications if potential safety issues are monitored. In some embodiments, the at least one safety monitoring device monitors the thermal properties of the energy storage device. In some embodiments, the at least one safety monitoring device includes thermal cameras to monitor the temperature of the energy storage device. In some embodiments, the at least one safety monitoring device includes a thermocouple, resistive thermal device, thermal scanner, bimetallic device, thermometer, or other temperature measuring device to monitor the temperature of the energy storage devices. In some embodiments, the at least one safety monitoring device can measure the gas composition or the presence of certain gases near or around the energy storage device. In some embodiments, "near or around the energy storage device" can refer to an area within about 10 mm, within about 8 mm, within about 7 mm, within about 6 mm, within about 5 mm, within about 4 mm, within about 3 mm, within about 2 mm, within about 1 mm, or within about 500 μm of an external surface of the energy storage device, inclusive of all values and ranges therebetween. In some embodiments, the at least one safety monitoring device can measure the state-of-charge (e.g., by measuring the open circuit battery electrochemical potential or through coulomb counting), impedance, acoustic properties or visual properties to assess the physical or chemical condition (e.g., state-of-health or remaining useful life) of the energy storage device. In some embodiments, the assessment of the physical or chemical condition of the energy storage device is accompanied by analytical, statistical, or machine-learning-based approaches, such as the use of neural networks, fuzzy logic networks. Kalman filters, particle filters, adaptive filters, least squares methods, entropic methods, stochastic methods, or other methods, including those mentioned in Lipu et al. (Lipu M S et al., *Journal of Cleaner Production* 205:115-133 (2018), the disclosures of which, along with their references are incorporated herein in its entirety. In some embodiments, the at least one safety monitoring device includes a mitigation system to improve the safety of the sorting process. The mitigation system can prevent hazardous events by isolating the energy storage device of concern (e.g., a damaged, leaking, or combusting energy storage device), ventilating the area near or around the energy storage device of concern, or applying flame-retardant materials or fire suppression materials to the area near or around the energy storage device of concern.

Figure 3:
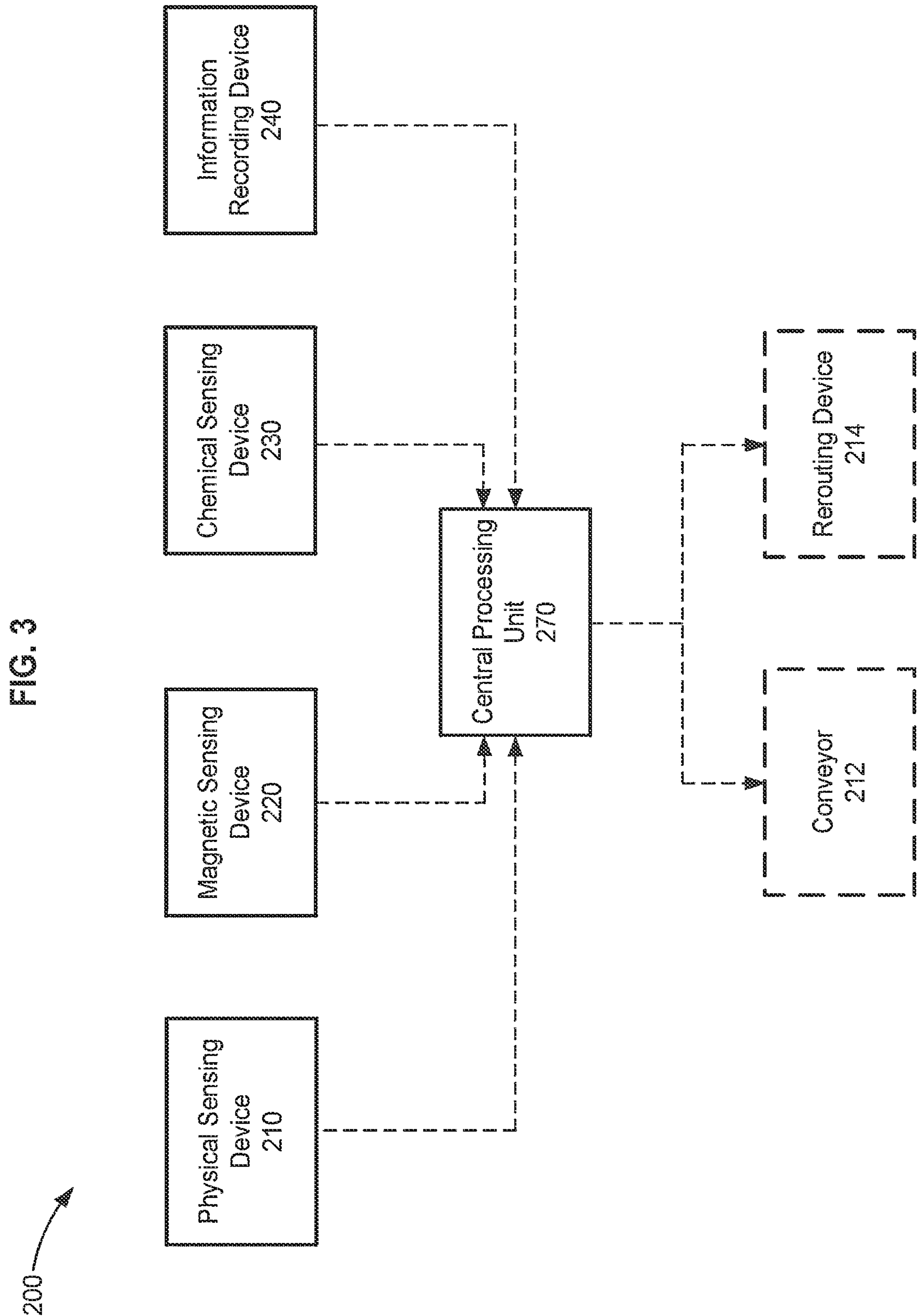
FIG. 3 is a schematic diagram of a system for sorting energy storage devices, according to an embodiment.

FIG. 3 is a schematic diagram of a system 200 for sorting energy storage devices, according to an embodiment. As shown, the system 200 includes a physical sending device 210, a magnetic sensing device 220, a chemical sensing device 230, an information recording device 240, a central processing unit (CPU), a conveyor 212, and a rerouting device 214. In some embodiments, the physical sensing device 210, the magnetic sensing device 220, the chemical sensing device 230, and the information recording device 240 can be the same or substantially similar to the physical sensing device 110, the magnetic sensing device 120, the chemical sensing device 130, and the information recording device 140, as described above with reference to FIG. 2. Thus, certain aspects of the physical sensing device 210, the magnetic sensing device 220, the chemical sensing device 230, and the information recording device 240 are not described in greater detail herein. Dotted arrows indicate the conveyance of information from one process unit to another.

In some embodiments, the CPU 270 can process information collected from the physical sensing device 210. Instructions from the CPU 270 can be sent to the conveyor 212 and/or the rerouting device 214 to begin a sorting process, reroute the energy storage devices to the next sensing devices, or to a final location. In some embodiments, the CPU 270 can process information collected from the magnetic sensing device 220. Instructions can then be sent to the conveyor 212 and/or the rerouting device 214 to reroute energy storage devices to the next sensing devices, or to a final location. In some embodiments, the CPU 270 can process information collected from the chemical sensing device 230. Instructions are then sent to the conveyor 212 and/or the rerouting device 214 to reroute the energy storage devices to the final location. In some embodiments, the CPU 270 can receive information from the information recording device 240. The information recording device 240 can provide information about the energy storage devices, including but not limited to batch number, identification number or code, date and/or time of processing or receipt, quality characteristics, or other data that can be utilized in identifying or tracking the energy storage device. In some embodiments, the CPU 270) processes, packs, and uploads the information via information packing and uploading instructions recorded for the energy storage device before and after sorting. In some embodiments, this information can be uploaded to a server or a database that is either locally stored or remotely stored (including cloud-based storage).

In some embodiments, system 200 (or other systems described herein) utilizes a machine learning classification method to process the sorting decision. Data can be previously collected to develop a classification model for the machine learning classification method. The classification model can be tested to ensure the accuracy of the classification model in identifying and sorting the energy storage device based on chemical composition. The classification model can be updated as necessary for reasons including, but not limited to, improving accuracy or accounting for new energy storage devices.

In some embodiments, the machine learning classification method utilizes k-nearest neighbors (k-NN). In some embodiments, the machine learning classification method utilizes a decision tree. In some embodiments, the machine learning classification method utilizes logistic regression. In some embodiments, the machine learning classification method utilizes naïve Bayes. In some embodiments, the machine learning classification method utilizes principal component analysis. In some embodiments, the machine learning classification method utilizes feature selection. In some embodiments, the machine learning classification method utilizes a deep learning or neural network (such as artificial neural network or convolutional neural network) method. In some embodiments, the machine learning classification method utilizes a combination of machine learning classification methods.

In some embodiments, the classification model is stored directly in the system 200. In other words, the system 200 can utilize the classification model directly. In some embodiments, the classification model can be stored in a central location or a cloud-based location. In these embodiments, the classification model can be made available to be downloaded to the system 200.

In some embodiments, the datum generated from the physical sensing device 210 and/or the magnetic sensing device 220 and/or the chemical sensing device 230 can be uploaded to a server that stores the classification model. The server can be configured to process the uploaded data using the machine learning classification to produce the sorting decision. The sorting decision can be downloaded by system 200 and utilized by the system 200 (e.g., to control a rerouting device or conveyor to implement the sorting decision). In some embodiments, the server includes a cloud server, and system 200 is configured to implement cloud computing using a cloud computing service (e.g., Amazon Web Services, Azure, Google) or an Industrial Internet of Things (IIOT) service (e.g., General Electric Predix, Siemens Mindsphere.

In some embodiments, the system 200 can be connected to safety, quality, production, materials resource planning, accounting, logistics, waste management, or other enterprise software. The system 200 can also output data to be used in the safety, quality, production, materials resource planning, accounting, logistics, waste management, or other enterprise software. In some embodiments, the system 200 can receive data from the safety, quality, production, materials resource planning, accounting, logistics, waste management, or other enterprise software to be utilized in the sorting decision process, for maintenance purposes, or other purposes. In some embodiments, the system 200 can be used to electronically record, accumulate, and/or relay information pertinent to the sorting operation. In some embodiments, the weight and type of the energy storage device can be recorded, accumulated, and/or relayed to another system or party.

The apparatuses, methods, and systems described herein can be implemented, in all or in part, as computer-executable instructions on computer-readable media. As understood by a person skilled in the art, the various steps of the apparatuses, methods, and systems described herein may be implemented as various blocks, operations, routines, tools, modules, and techniques, which in turn may be implemented in hardware, firmware, software, or any combination of hardware, firmware, and/or software. In certain embodiments, hardware implementations can include but are not limited to a custom integrated circuit (IC), an application-specific integrated circuit (ASIC), a field programmable logic array (FPGA), and a programmable logic array (PLA), etc. In other embodiments, when implemented as software, the software may be stored in any computer-readable medium known in the art, including, but not limited to, a solid-state disk, a magnetic disk, an optical disk, or other storage media, in a RAM or ROM or flash memory of a computer, processor, hard disk drive, thumb drive, optical disk drive, or tape drive. In one embodiment, the software may be delivered to a user or a computing system via any delivery method known in the art, including but not limited to over a communication channel such as the internet, a wireless connection, a satellite connection, a telephone line, a computer-readable disk, local area network, wide area network, or other transportable computer storage mechanism.

EXAMPLES

Example 1: This example embodiment pertains to the sorting of a mixed set of batteries 401 (which may include non-battery materials). The example utilizes three sets of sensing devices. The physical sensing includes an industrial camera and a mass sensor. The magnetic sensing includes a magnetic-force transducer and optionally a distance-, vision- or force-based shape mapping system. The chemical sensing 450) includes an XRF analyzer. The sensing devices can be used to collect battery features such as size, weight, label information, magnetic property, and chemical composition. A mass sensor can detect if a battery is entered the sorting system and triggers the subsequent sorting processes. An industrial camera captures visual information of the batteries, such as size, shape, color, and label information. Part or all of this visual information is extracted and analyzed by itself or in conjunction with information collected from other sensor devices to make a decision on either sorting or rerouting of the batteries.

A magnetic-force transducer together with a distance sensor, vision sensor, or force mapping sensor can accurately generate the mapping of the magnetic properties over the battery and indicate the presence and location of magnetic materials, such as iron, nickel, etc. This information can be compared to standards or metrics, including those that have dependency on sensor reading intensity and/or location-dependent intensities. Location-dependent intensities can be averaged or summarized using certain algorithms to provide simplified standards or metrics. Part or all of this magnetic information is extracted and analyzed by itself or in conjunction with information collected from other sensor devices to make a decision on either sorting or rerouting of the batteries.

The XRF analyzer can be used to provide information on the chemical composition of the battery. In certain cases, XRF analyzer can also effectively penetrate the packaging of batteries (e.g., pouch LIBs or lead acid batteries) to provide information on the chemical composition of the internal components of the battery. The XRF analyzer is especially effective at analyzing the internal components of the battery if the battery packaging is comprised of thin plastics or polymer-laminated aluminum film. Accordingly, the XRF can accurately measure the composition of heavier chemical elements in the cathode material, current collector, or other internal components of batteries, including LIBs. Collecting data on the chemical composition can help to sort batteries, especially LIBs, based on their cathode material chemistry.

The data collected through the industrial camera, mass sensor, magnetic-force transducer, and/or XRF analyzer can be used as training data to develop a classification model used in the machine learning technique. The classification model can be downloaded onto the system or made available as a web service through an IIOT platform to all the equipment which are registered on the platform. Data can be sent from the equipment to the IIOT platform once EOL batteries are fed into the equipment and the IIOT platform can analyze the data and return sorting results based on its classification model. Alternatively, the classification model can be stored locally on a server, and analysis can be performed locally using a computational device. The classification model can be used in conjunction with other algorithms, models, and programs to collectively make a decision on sorting or rerouting batteries. The data collected through the industrial camera, mass sensor, magnetic-force transducer, and/or XRF analyzer can be used to determine if a battery requires additional sensing steps to be sorted. For example, the results of the analyzed data from the physical sensing can determine whether the battery requires additional sensing steps or if the battery can be directly sorted into a category or type.

Example 2: In this example embodiment, a system sorts batteries in three steps. In a first step, input batteries are sorted into LIBs, alkaline batteries, nickel-metal hydride batteries, nickel-cadmium batteries, lead-acid batteries, primary lithium batteries, other batteries, and other non-battery materials via a physical sensing device. The second stage of sorting includes magnetic sensing used to further sort the LIBs into subcategories. The first subcategory of LIBs are not subject to chemical sensing, while the second subcategory of LIBs are subject to chemical sensing. The decision to sort into these two categories can be based on factors such as the presence, quantity, and location of magnetic materials, as, for example, measured by the intensity of the magnetic sensing device. The decision to sort into one of these two categories can also be based on the result of the physical sensing. The batteries subject to chemical sensing are sorted via a chemical sensing device (e.g., XRF analyzer) into lithium cobalt oxide LIBs, lithium nickel manganese cobalt oxide LIBs, lithium iron phosphate LIBs, lithium nickel cobalt aluminum LIBs, and lithium manganese oxide LIBs.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, "energy storage device" should be understood to refer to any system, apparatus, or device that stores energy in the form of chemical, electrochemical, electrical, or other potential energy, which can be harvested or channeled for use. Energy storage devices can include, but are not limited to: batteries, fuel cells, capacitors, and/or supercapacitors.

As used herein, a "central processing unit" should be understood to refer to a system that includes programs for performing logic, controlling, arithmetic, and/or input-output operations specified by instructions in the programs.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B): in another embodiment, to B only (optionally including elements other than A): in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A): in yet another embodiment, to at least one, optionally including more than one, A, and at least one, optionally including more than one, B (and optionally including other elements); etc.

In the embodiments, as well as in the specification above, all transitional phrases such as "comprising." "including." "carrying." "having." "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of sorting used energy storage devices, the method comprising:

measuring, via a physical sensing device, a physical property of a first plurality of energy storage devices;

sorting the first plurality of energy storage devices into a second plurality of energy storage devices and a third plurality of energy storage devices based on sorting instructions generated by a central processing unit (CPU) configured to receive the measured physical property;

delivering the second plurality of energy storage devices to a first location;

measuring, via a magnetic sensing device, a magnetic property of the third plurality of energy storage devices;

sorting the third plurality of energy storage devices into a fourth plurality of energy storage devices and a fifth plurality of energy storage devices based on sorting instructions generated by the CPU configured to receive the measured physical property and measured magnetic property;

delivering the fourth plurality of energy storage devices to a second location;

measuring, via a chemical sensing device, a chemical property of the fifth plurality of energy storage devices;

sorting the fifth plurality of energy storage devices into a sixth plurality of energy storage devices and a seventh plurality of energy storage devices based on sorting instructions generated by the CPU configured to receive the measured physical property, measured magnetic property, and measured chemical property;

delivering the sixth plurality of energy storage devices to a third location; and delivering the seventh plurality of energy storage devices to a fourth location.

2. The method of claim 1, wherein the physical property includes at least one of weight, a label, a physical dimension, a color, or a shape.

3. The method of claim 2, wherein the physical sensing device includes a camera.

4. The method of claim 2, further comprising:

combining data about at least one of physical dimension or shape with weight data to generate a pressure mapping of an energy storage device from the first plurality of energy storage devices.

5. The method of claim 1, wherein the magnetic sensing device uses eddy current separation to sort the third plurality of energy storage devices into the fourth plurality of energy storage devices and the fifth plurality of energy storage devices.

6. The method of claim 1, wherein the chemical sensing device includes a radiation source and a detector, the detector configured to detect an output radiation reflected or backscattered from an energy storage device.

7. The method of claim 1, wherein sorting the first plurality of energy storage devices into the second plurality of energy storage devices and the third plurality of energy storage devices is guided via the central processing unit configured to receive data from the physical sensing device and provide sorting instructions to a routing device based on the data received from the physical sensing device.

8. The method of claim 1, wherein measuring the chemical property is via at least one of X-ray fluorescence spectroscopy, ultraviolet photoelectron spectroscopy, projectional radiography, computed tomography, or Raman spectroscopy.

9. The method of claim 1, further comprising:

pretreating the first plurality of energy storage devices, the pretreating including at least one of cleaning, removing protective covering materials, or separating the first plurality of energy storage devices from non-energy storage device materials.

10. The method of claim 1, wherein the energy storage devices include at least one of an electrochemical cell or a battery pack.

11. The method of claim 1, further comprising:

prior to measuring the physical property, feeding the first plurality of energy storage devices to a measuring location via at least one of a robotic arm, a pusher, or a conveyor.

12. The method of claim 1, wherein the physical sensing device employs acoustic waves to measure a distance from the physical sensing device to an energy storage device from the first plurality of energy storage devices.

13. The method of claim 1, further comprising:

isolating a problematic energy storage device upon detecting a dangerous condition in the energy storage device, the dangerous condition determined by measuring at least one of a temperature of the energy storage device, a gas composition in an immediate area surrounding the energy storage device, a state-of charge of the energy storage device, an impedance of the energy storage device, acoustic properties of the energy storage device, or visual properties of the energy storage device.

14. The method of claim 1, further comprising:

uploading at least one of the physical property, the magnetic property, or the chemical property to a server, the server including a classification model; and analyzing the at least one of the physical property, the magnetic property, or the chemical property via the classification model.

* * * * *